(12) United States Patent
Kurup

(10) Patent No.: US 8,608,088 B2
(45) Date of Patent: Dec. 17, 2013

(54) DATA CARRIER DEVICE

(75) Inventor: Dhanesh G. Kurup, Uppsala (SE)

(73) Assignee: Wavelogics AB, Uppsala (SE)

( * ) Notice: Subject to any disclaimer, the term of this patent is extended or adjusted under 35 U.S.C. 154(b) by 555 days.

(21) Appl. No.: 12/746,578

(22) PCT Filed: Dec. 5, 2007

(86) PCT No.: PCT/SE2007/001085
§ 371 (c)(1),
(2), (4) Date: Sep. 10, 2010

(87) PCT Pub. No.: WO2009/072936
PCT Pub. Date: Jun. 11, 2009

(65) Prior Publication Data
US 2011/0011938 A1    Jan. 20, 2011

(51) Int. Cl.
*G06K 19/06* (2006.01)
*G06K 7/00* (2006.01)
*H04Q 5/22* (2006.01)

(52) U.S. Cl.
USPC ........... 235/494; 235/435; 235/439; 235/492; 340/10.1

(58) Field of Classification Search
USPC .............. 235/494, 435, 439, 492; 342/44, 51; 310/318, 319
See application file for complete search history.

(56) References Cited

U.S. PATENT DOCUMENTS

| | | | |
|---|---|---|---|
| 3,091,743 A * | 5/1963 | Wilkinson | .................... 333/127 |
| 4,263,595 A | 4/1981 | Vogel | |
| 4,757,266 A * | 7/1988 | Yoshida et al. | ............... 329/309 |
| 5,347,280 A | 9/1994 | Schuermann | |
| 5,574,470 A | 11/1996 | De Vall | |
| 5,625,341 A | 4/1997 | Giles et al. | |
| 5,682,143 A | 10/1997 | Brady et al. | |
| 5,874,902 A | 2/1999 | Heinrich et al. | |
| 5,995,006 A | 11/1999 | Walsh | |
| 6,100,804 A | 8/2000 | Brady et al. | |
| 6,326,845 B1 * | 12/2001 | Miyaji et al. | .................. 330/151 |
| 6,346,884 B1 | 2/2002 | Uozumi et al. | |
| 6,424,263 B1 | 7/2002 | Lee et al. | |
| 6,433,671 B1 | 8/2002 | Nysen | |

(Continued)

FOREIGN PATENT DOCUMENTS

DE   2821299 A1   11/1979
WO   2006043876 A1   4/2006

OTHER PUBLICATIONS

International Search Report, dated Aug. 26, 2008, from corresponding PCT application.

(Continued)

*Primary Examiner* — Seung Lee
*Assistant Examiner* — Claude J Brown
(74) *Attorney, Agent, or Firm* — Young & Thompson

(57) ABSTRACT

A passive data carrier device (100) comprises an input port (110) for receiving a finite duration radio frequency input signal of defined time and frequency spectral characteristics. The data carrier device (100) comprises at least one branch (130) having combinations of passive RF elements, such as band filters (134) and time delays (136), optionally together with powder dividers (120) and combiners (140). The input signal is processed by the device (100) to form an output signal having time and frequency spectral characteristics different from the input signal. The data carrier device (100) has potential application in an RF identification system.

21 Claims, 7 Drawing Sheets

(56) References Cited

U.S. PATENT DOCUMENTS

| | | |
|---|---|---|
| 6,441,740 B1 | 8/2002 | Brady et al. |
| 6,531,957 B1 * | 3/2003 | Nysen ........................... 340/10.1 |
| 6,621,417 B2 | 9/2003 | Duncan et al. |
| 6,708,881 B2 | 3/2004 | Hartmann |
| 6,771,944 B2 * | 8/2004 | Harano ....................... 455/276.1 |
| 6,825,794 B2 * | 11/2004 | Edmonson et al. ............. 342/51 |
| 7,973,645 B1 * | 7/2011 | Moretti et al. ................ 340/10.1 |
| 2002/0131523 A1 * | 9/2002 | Nagasaka et al. .............. 375/297 |
| 2004/0075497 A1 * | 4/2004 | Miyaji et al. ................... 330/151 |
| 2005/0176368 A1 * | 8/2005 | Young et al. ................... 455/11.1 |
| 2006/0234662 A1 * | 10/2006 | Diloisy .......................... 455/273 |
| 2007/0142089 A1 * | 6/2007 | Roy ........................... 455/562.1 |
| 2008/0001750 A1 * | 1/2008 | Kurup ......................... 340/572.1 |

OTHER PUBLICATIONS

European Search Report dated Mar. 7, 2011, corresponding to PCT/SE2007/001085.

* cited by examiner

DATA CARRIER DEVICE

TECHNICAL FIELD

The present invention generally relates to a data carrier device, and in particular to a passive data carrier device useful in a radio frequency identification tag.

BACKGROUND

A variety of technologies for storing data are available today with varying scope of application depending upon their cost, memory capacity and method of data access. Examples of data storage techniques associated with computer industry are floppy diskette, compact disc and semiconductor based memories.

Handling of manufactured goods and materials also require some form of data carrier device for their identification or surveillance from a distance. Their demand in terms of storage capacity is considerably lower than that required for computer industry. Two widely used methods for article identification and surveillance are printed optical bar-codes and magnetic-strips. Bar-codes are commonly used for identifying objects in shops and supermarkets. An application of magnetic strips is the credit card. The main reason for the popularity of bar-codes and magnetic strips is that they are inexpensive. The drawback of bar-codes and magnetic strips is that the reader has to have a physical contact or has to be very close, say a few centimeters, from the bar-code or magnetic strip to read. If there is no physical contact, then the space between the code and the reader should not have any obstruction and properly aligned for correct readability. This requires concentration from the part of the human operator and therefore is inconvenient.

RFID (radio frequency identification) is another technology for article surveillance and identification. RFID enables larger readability distance compared to that of the magnetic strip technology or the bar-code technology. The data is stored in an RFID system called RFID tag which once interrogated by the remote reader, return an encoded radio signal that contains the data. Different embodiments of RFID tags are disclosed, for example, in the following publications: U.S. Pat. Nos. 5,574,470; 5,625,341; 5,682,143; 5,995,006; 6,100,804; 6,346,884; 6,424,263; and 6,441,740.

RFID-tag devices can be broadly divided based on the criterion whether they contain an integrated memory chip or not. Those that contain a memory chip, e.g. U.S. Pat. No. 5,874,902, in general have larger memory capacity than those of chip-less tags, e.g. U.S. Pat. No. 6,708,881. However, chip based tags have a significantly higher cost compared to that of the chip-less tags.

RFID-tags can also be divided based on the criterion whether they contain a battery or not, denoted active and passive tags in the art. In general active tags, which are the most commonly available tags in market today, have a larger operational distance range when compared to the passive tags, e.g. U.S. Pat. No. 6,621,417.

Passive chip-less data carrier devices used in RFID tags have significant advantages in that they are passive, of low cost and enable readability at large distances. Furthermore, battery-free tags do not have the problem of limited life time and the need for battery exchanges.

The international application WO 2006/043876 discloses a passive chip-less data carrier device that comprises a powder divider having multiple output terminals connected to different branches. Each branch comprises a unique set of a time delay, a phase shifter and an attenuator. The output terminals of the branches are then combined in a power combiner.

SUMMARY

The passive chip-less data carrier devices of WO 2006/043876 work really well with a finite radio frequency input signal of a given frequency and can modulate the input signal in the time-domain to get, for each data carrier device, a unique time-modulated output signal. However, the number of different data carrier devices that can uniquely respond to a given input or mother signal is highly restricted. As a consequence, the prior art document WO 2006/043876 teaches the generation of a multitude of child signals from the mother signal. Each such child signal can then be used as input signal to the data carrier devices.

The present invention overcomes these and other drawbacks of the prior art arrangements.

It is a general object of the present invention to provide a passive data carrier device.

It is another object of the invention to provide a passive data carrier device that can implemented in a radiation frequency identification tag.

These and other objects are met by the invention as defined by the accompanying patent claims.

Briefly, the present invention involves a passive data carrier device comprising at least one input port adapted for receiving a finite duration radio frequency (RF) signal of defined time and frequency spectral characteristics. M branches of the device have a respective input terminal connected to one of the input ports and comprise passive RF elements for processing the input signal. At least one output port is connected to the branches and receives the processed output signal that has time and frequency spectral characteristics different from the input signal.

According to the invention, each of the M branches comprises a combination of $R_k$ band filters and $S_k$ time delays, k=1 to M. The numbers $R_k$, $S_k$ are positive integers. Furthermore, at least one of $R_k$, $S_k$ is larger than one if M is equal to one and $R_k$, $S_k$ are equal to or larger than one if M is a positive integer larger than one.

The combination of the band filter(s) and time delay(s) is different for different branches in the data carrier device, where the particular selection of band filters and time delays in the branches dictates the modulation in the time and frequency domain of the input signal to get the processed output signal.

Thus, the data carrier device is realized as a combination of RF filters and time delays resulting in a passive RF circuit. An input or energizing signal enters a port in the data storage circuit and comes out through an output port of the data carrier device resulting in an output signal with spectral and time characteristics depending upon the parameters of the filters and time delays.

The device can have a combined input and output port by providing a termination at the output terminals of the M branches. This results in a one port data carrier device where the output signal is generated at the input port. Here the time and spectral characteristics of the output signal is determined by the parameters of the time delays, filters and the termination. Therefore, different characteristics of delays, filters and terminations result in different output signals from the data carrier device. If we have the capability of generating N different signals using the characteristics of filters, time delays and terminations, the data carrier device will have a data carrying capacity of $\log_2 N$ bits.

The data carrier device can be connected to one or more antennas of an antenna system to be capable of receiving and radiating processed signal. The data carrier device when connected with antennas can be used as a radio frequency identification tag. A remote device capable of receiving and interpreting the output signals from the said data carrier device as bits can then be used as reader or interrogator of the RFID tag.

The invention offers the following advantages:

Can be implemented using only passive RF components;
Does not require a dedicated power source or battery;
Provides a chip-less implementation of data carrier device;
Processes an input signal both in the time and frequency domain; and
Can generate a vast amount of RFID tag addresses from a single interrogation signal.

Other advantages offered by the present invention will be appreciated upon reading the below description of the embodiments of the invention.

SHORT DESCRIPTION OF THE DRAWINGS

The invention together with further objects and advantages thereof, may best be understood by making reference to the following description taken together with the accompanying drawings, in which.

DETAILED DESCRIPTION

Figure 1:
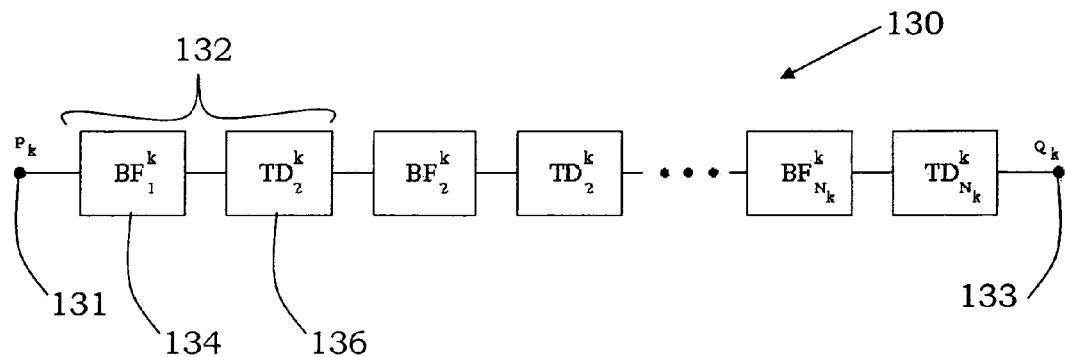
FIG. 1 illustrates an embodiment of a branch useful in a data carrier device according to the present invention.

Throughout the drawings, the same reference characters will be used for corresponding or similar elements.

The present invention generally relates to a passive, chip-less data carrier device that may be used in radio frequency identification (RFID) tags for generating, based on the reception of an input signal, an output signal processed in the time and frequency domain for the purpose of generating an output signal that can be used as unique address signal for the RFID tag.

The passive data carrier device of the invention comprises at least one input port adapted for receiving a finite duration radio frequency (RF) input signal of defined time and frequency spectral characteristics. The device also comprises M branches that each has an input terminal connected to one of the at least one input ports and an output terminal connected to an output port, which can be the same or different from the input port. A branch comprises passive RF elements for processing the input signal to form an output signal at the output port(s) that, due to the branch processing, has time and frequency spectral characteristics different from the input signal. This means that the data carrier device of the present invention includes passive RF elements that are able to modulate a RF signal both in the time and frequency domain to generate an encoded RF signal.

According to the invention, the input signal is a finite duration RF signal of defined time and frequency spectral characteristics. A binary on-off keyed waveform of a given (frequency) bandwidth, for instance a sinusoidal wave of fixed duration when ON and zero signal when OFF is an example of a useful. RF input signal. Different data carrier devices of the invention can be useful for different bandwidth intervals. As a consequence, a set of finite duration RF signals of different time and frequency characteristics can be available and used in connection with different carrier devices. The RF input signal can be generated locally or can be made available remotely through a wired connection or preferably through antennas wireless from a remote point and can be conveniently called the energizing signal for the data carrier device.

The invention is particularly adapted for usage in connection with high frequency RF signals, in which the RF input signal has a bandwidth in the GHz range. The invention is though not limited to this particular frequency band.

The invention teaches that the data carrier device comprises M branches, where each of the branches comprises a combination of $R_k$ band filters and $S_k$ time delays, preferably in the form of $N_k$ pairs of band filters and time delays. In a particular embodiment, each such pair in a branch is unique for that branch in that it contains a combination of band filter and time delay that no other pair of that branch contains. This, though, means that another pair of the branch can then have the same band filter (time delay) but then has a) different associated time delay (band filter).

According to the invention, $R_k$, $S_k$, $N_k$ are positive integers. Furthermore, at least one of $R_k$, $S_k$ is larger than one if M is equal to one and $R_k$, $S_k$ are equal to or larger than one if M is a positive integer larger than one. Similarly, if M is equal to one $N_k$ is larger than one and if M is a positive integer larger than one, then $N_k$ is equal to or larger than one.

In other words, the data carrier device can include a single branch but then that single branch comprises at least two band filters and at least one time delay or at least one band filter and at least two time delays. If the device on the other hand contains at least two branches, each branch can contain a unique combination of at least one band filter and time delay, although in a preferred embodiment, they contain more than one pairs. It is also anticipated by the present invention that the branches in a multi-branch implementation do not necessarily have to contain the same number of band filters and time delays. The important feature is instead that the combination of the $R_k$ band filters and $S_k$ time delays is different for different branches of the M branches. Due to the inclusion of these different combinations of band filters and time delays, a resulting processed output RF signal will have time and frequency spectral characteristics different from the input signal (energizing signal).

It is anticipated by the present invention that a time delay can be from zero seconds, i.e. basically zero delay, and above.

FIG. 1 illustrates the functional blocks and their interconnection circuit in a branch 130 in a preferred embodiment of the data carrier. The branch 130 has an input terminal 131 and an output terminal 133. Between these terminals 131, 133 there is a combination of pairs 132 of band filters 134 and time delays 136. Each pair 132 in a give branch 130 is preferably unique compared to other filter-time delay pairs 132 in the same branch 130. This means that comparing two such pairs 132 in a branch 130 they contain different band filters 134 and/or different time delays 136. However, a same band filter 134 may occur at least twice in a branch 130 for increasing the sharpness of the responses.

The branch k 130 comprises a combination of $N_k$ pairs 132 of band filters 134 and time delays 136, where k=1 to M. The number $N_k$ is a positive integer equal to or larger, preferably larger, than one. However, for single branch devices, the number $N_1$ (k=1) is a positive integer equal to or larger than two.

In those cases M is a positive integer larger than one, the different numbers $N_k$ may all be the same or different for different k:s.

The band filter (BF) 134 can either be a band pass filter or band reject filter. In the figure, each band filter 134 is followed by a time delay (TD) 136. In an alternative implementation, each time delay 136 is followed by a band filter 134. In alternative embodiments, the branch 130 does not have to contain pairs 132 of band filters 134 and time delays 136, i.e. $R_k \cdot S_k$ but instead $R_k > S_k$ or $R_k < S_k$.

As illustrated in FIG. 1, the $k^{th}$ branch 130 consists of $N_k$ band filters 134 and $N_k$ time delays 136. Part of the input high frequency signal entering the input terminal $P_k$ 131 of the branch 130 will be subjected to reflection and the remaining portion of the signal leaves the output port $Q_k$ 133 of the branch 130. The reflection at port $P_k$ 131 and transmission of the signal through port $Q_k$ 133 are measurable and can be characterized in terms of its input reflection coefficient and transmission coefficient. Those skilled in the art of band filters and time delays can appreciate therefore that the characteristics of the reflected signal at port $P_k$ 131 and the transmitted signal at port $Q_k$ 133 in terms of its amplitude and phase in relation to frequency and time will depend upon the design parameters chosen for designing the band filters 134 and time delays 136.

Figure 2:
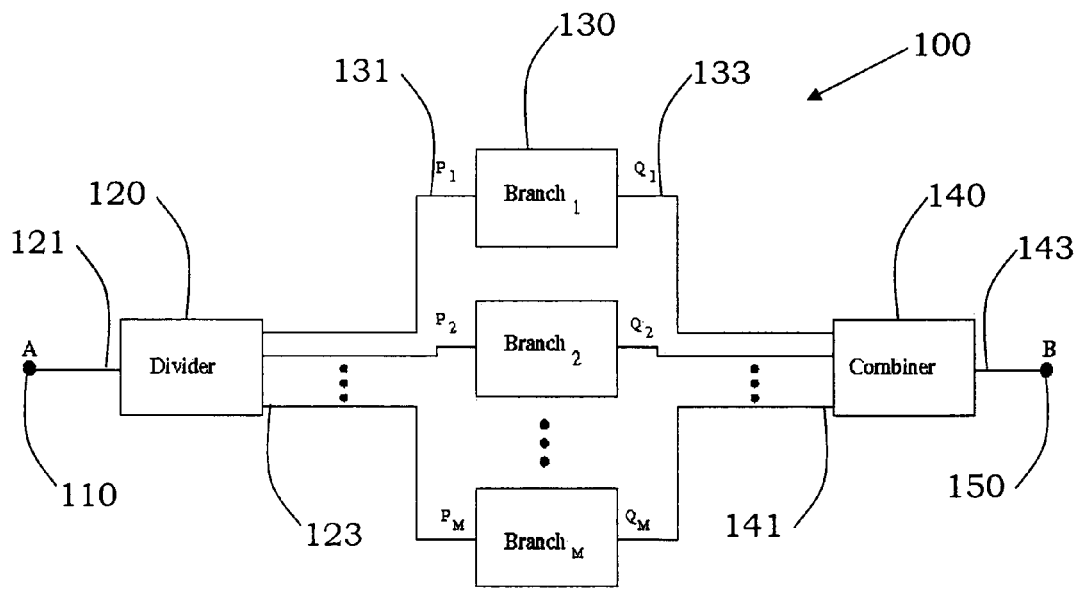
FIG. 2 illustrates an embodiment of a data carrier device according to the present invention with separate input and output ports.

FIG. 2 illustrates an embodiment of a data carrier device 100 according to the present invention. The input signal enters an input port A 110 that is connected to an input terminal 121 of a powder divider 120. The divider 120 divides the input signal by means of an M-way power division into M branch signals. The divider 121 therefore comprises M output terminals 123, each being connected to a respective input terminal 131 of the M branches 130. Each branch 130 can be as illustrated in FIG. 1.

The output terminals 133 of the branches 130 are connected to respective input terminals 141 of a power combiner 140. As a consequence, the output signals from the M branches 130 are combined by means of a power combiner 140 to form an output signal that is forwarded from an output terminal 143 of the combiner 140 to the output port B 150.

The reflected signal at port A 110 and the transmitted signal at port B 150 in terms of their amplitude and phase in relation to frequency and time will depend upon the design parameters chosen for designing the band filters, time delays, power combiner and power dividers.

As in quadrature phase shift modulation (QPSK) where four different phases of a signal result in a bit capacity of $\log_2 4 = 2$ bits, the capability of generating N signals of different properties of the signal at port B of the data carrier device 100 using the combination of filters and time delays for the data carrier device result in a data carrying capacity of $\log_2 N$ bits.

Figure 3:
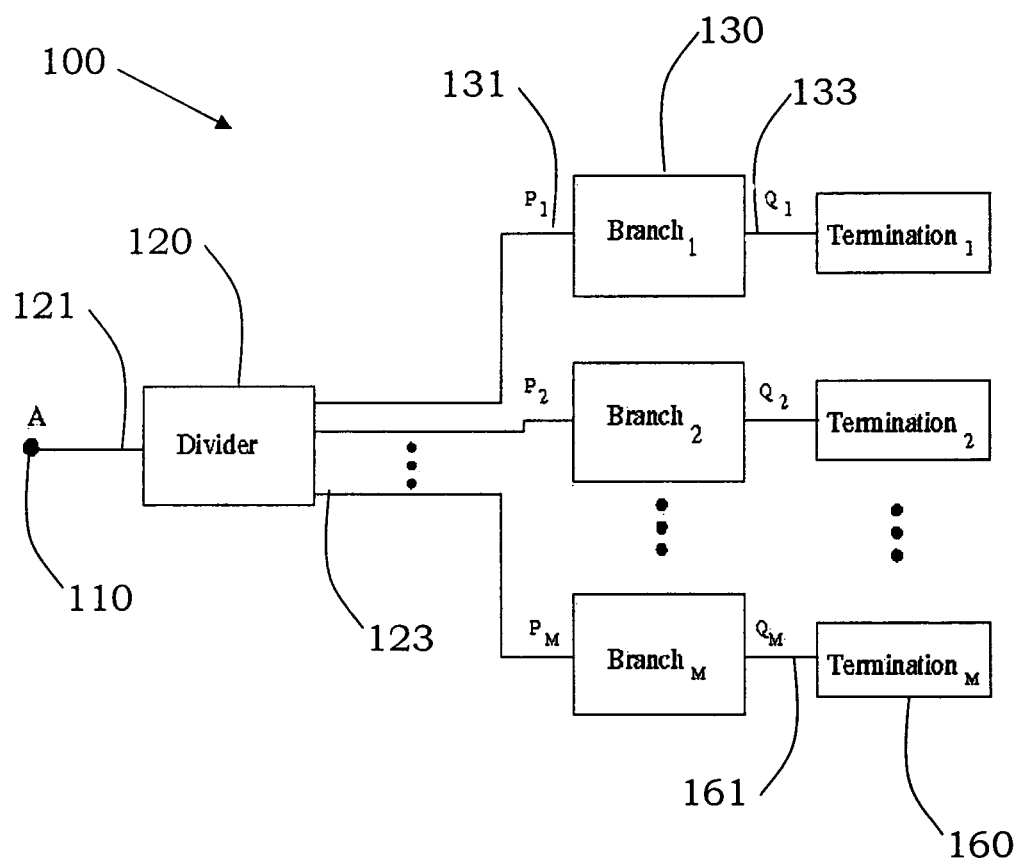
FIG. 3 illustrates an embodiment of a data carrier device according to the present invention with multiple terminations to form a combined input and output port.
Figure 4:
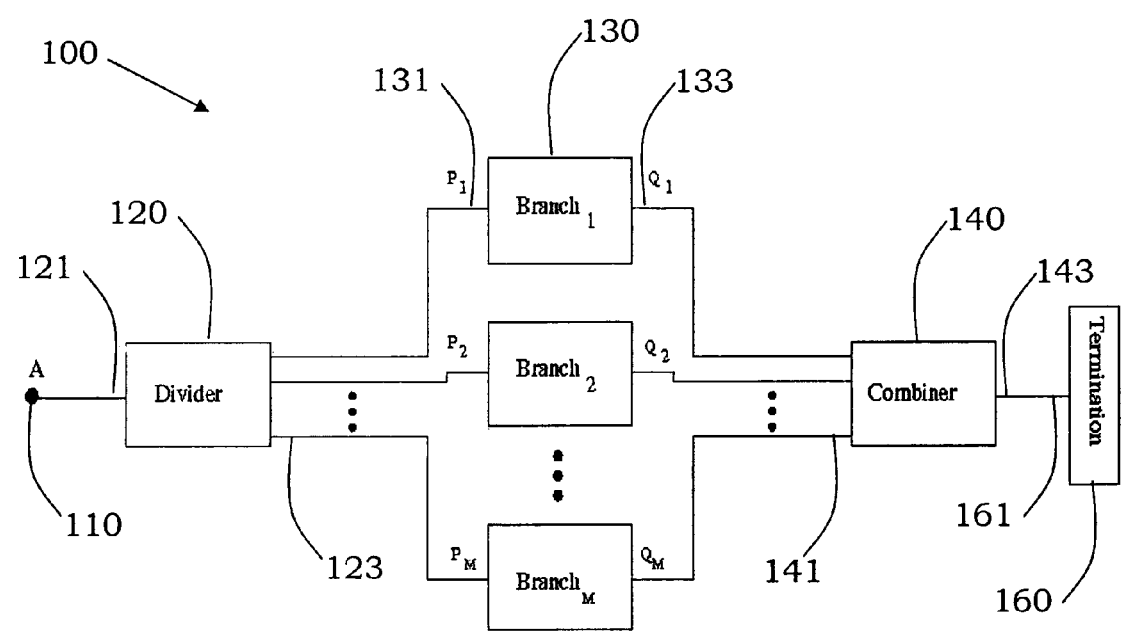
FIG. 4 illustrates an embodiment of a data carrier device according to the present invention with a single termination to form a combined input and output port.

FIG. 2 illustrates a data carrier device 100 with a separate input port A 110 and a separate output port B 150. FIGS. 3 and 4 illustrate one-port embodiments having a single port A 110 functioning both as input and output port.

In FIG. 3 the output terminals 133 of the M branches 130 are connected to respective input terminals 161 of M terminations or terminators 160. In this case, only the reflected signals will reach the combined input and output port A 110. The divider 120 in FIG. 3 will then both have power dividing and combining properties. An example of a suitable such divider/combiner is the Wilkinson's divider/combiner.

In FIG. 4 a single termination 160 is instead used by connecting the output terminal 143 of the power combiner 140 to the input terminal 161 of the single termination 160. The discussion above regarding combined dividing/combining functionality applies mutatis mutandis to this data carrier device embodiment 100.

The termination 160 can be realized as a time delay, an energy dissipater, an energy absorber, an open circuit, or as a short circuit. Therefore the capability of generating N signals of different properties at port A 110 of the data carrier device 100 in FIGS. 3 and 4 can be achieved through selection of or by varying the specifications of filters, time delays and terminations 160 in each branch 130. This result in a data carrying capacity of $\log_2 N$ bits for the data carrier device 100.

Figure 5:
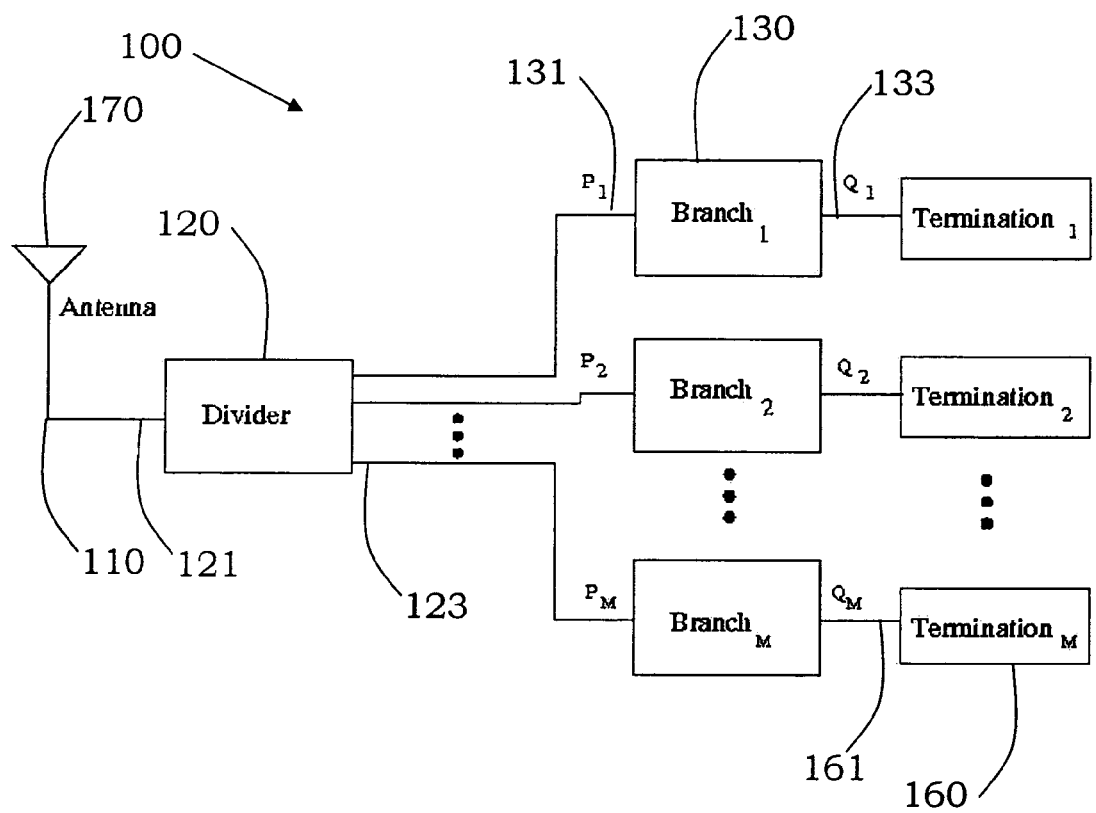
FIG. 5 illustrates the data carrier device of FIG. 3 equipped with a receiving and transmitting antenna for use in a radio frequency identification tag.

FIG. 5 illustrates an embodiment in which a receiving and transmitting antenna 170 is connected to port A 110 of the data carrier device 100 illustrated in FIG. 4. The antenna 170 then captures an input or energizing signal from a remote reader/interrogator. The input signal is then processed by the carrier device 100 to form a reflected output signal with different time and frequency characteristics than the input signal. This output signal is then transmitted by the antenna 170 and can be received by the reader/interrogator.

Figure 6:
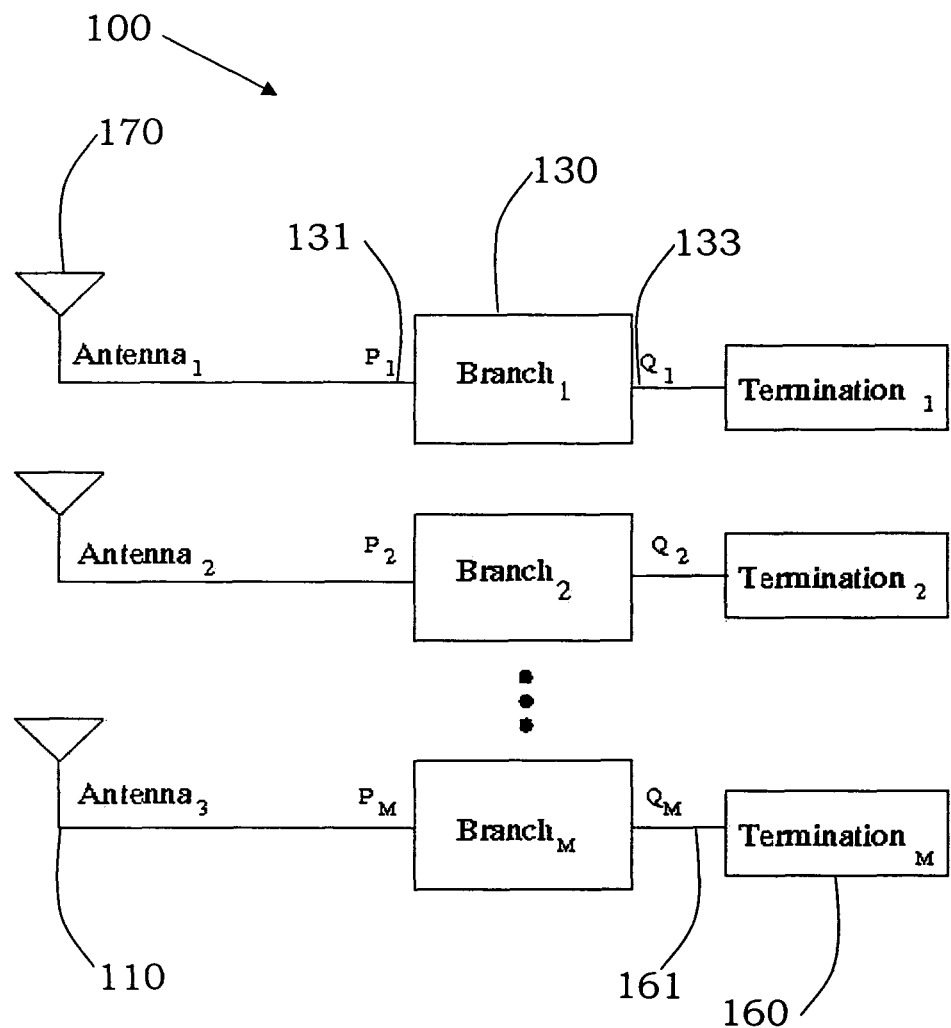
FIG. 6 illustrates a data carrier device equipped with multiple receiving and transmitting antennas for use in a radio frequency identification tag.

FIG. 6 illustrates a data carrier device 100 where each individual branch 130 is connected to a separate combined input and output port 110 and each port 110 has a dedicated receiving and transmitting antenna 170.

In both FIGS. 5 and 6, the received energizing signal enters the branches 130 of the data carrier device 100 via the antenna(s) 170. On the other hand, the antenna signal is provided by radiation from a remote point. In these embodiments, the capability of tuning the individual branch parameters such as the filter properties, time delay properties and terminations to obtain N different reflected signals from the antenna(s) 170 implies that the device 100 has a data carrying capability of $\log_2 N$ bits. Therefore, FIGS. 5 and 6 embody the capability of the data carrier device 100 together with antenna(s) 170 as a part of a RF identification/authentication system once it is energized by RF signal(s).

In FIGS. 5 and 6, the antenna(s) 170 has (have) been used both for receiving a RF input signal and for transmitting a RF output signal. The present invention can though instead utilize dedicated receiving antenna(s) and dedicated output antenna(s). For instance, a receiving antenna can be connected to the input port A 110 of FIG. 3 and another transmitting antenna is then connected to the output port B 150.

It is anticipated by the present invention that the teachings of the different embodiment described above and disclosed in the drawing can be combined to get new embodiments of the data carrier device of the present invention. Also such embodiments are encompassed in the scope of the invention.

Figure 7:
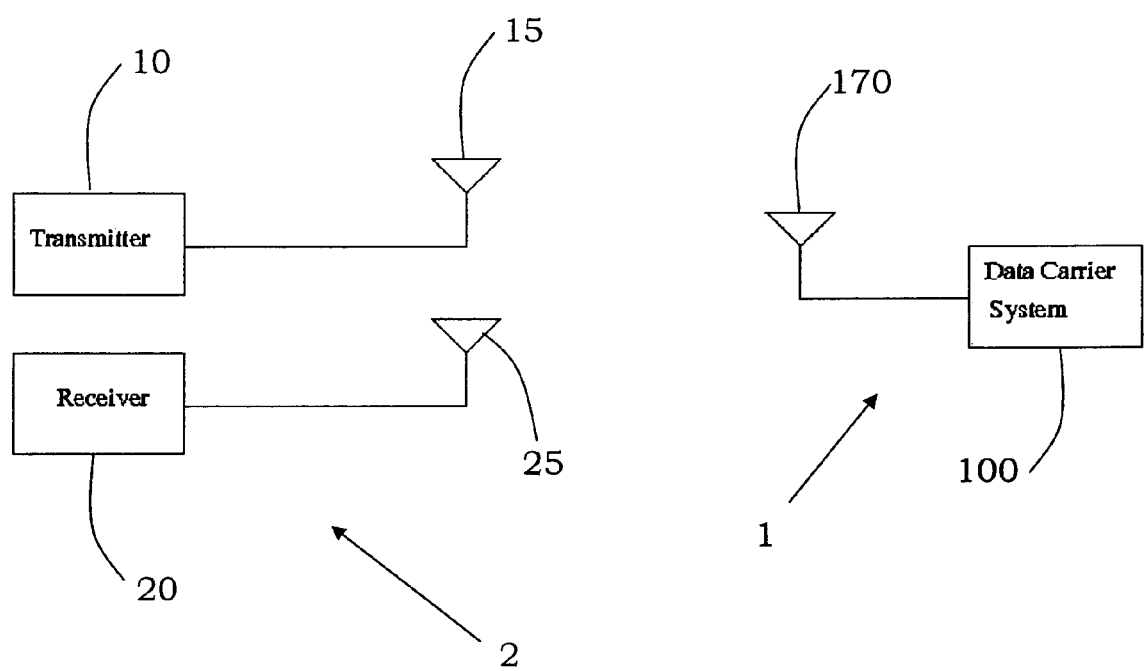
FIG. 7 illustrates a radio frequency identification tag according to the present invention in communication with a radio frequency identification reader.

A RF identification/authentication system for reading information stored in a RF tag 1 comprising at least one antenna 170 or antenna system connected to a data carrier device/system 100 of the present invention is illustrated in FIG. 7. FIG. 7 only shows the functional relationships between the entities, rather than any physical connections and/or physical relationships. The system in FIG. 7 includes a wireless RF transmitter 10 having a transmitting antenna 15 capable of sending electromagnetic radiations to the RF tag system 1. A receiver 20 with connected receiving antenna 25 is capable of detecting the radiations from RF tag system 1. The transmitter 10 and receiver 20 with their antennas 15, 25 can be housed in a single reader/interrogator device, schematically denoted with the reference number 2 in the figure.

The RF tag 1 can of course contain more than one passive data carrier device 100 according to the present invention. In such a case, each data carrier device 100 preferably has a dedicated antenna or antenna system 170.

The present invention has, due to the modulation in both the frequency and time domain, the capability of generating a vast amount of different output signals for a single input signal with given time duration and bandwidth. As a consequence, a single input signal can be used as interrogation signal for a vast amount of different RFID tags that each comprises a data carrier device of the invention but with different combinations of band filters and time delays.

As an example, assume a RFID tag design as illustrated in FIG. 5. Further assume that we have five different band reject filters $BF_i$ and five different time delays $TD_i$, i=1 to 5, available for usage in the data carrier device of the RFID tag. Also assume that each device comprises three branches (M=3) and that each branch comprises three pairs of filters and time delays ($N_k$=3, k=1 to 3) selected from the set of five band rejection filters and five time delays.

There are 3600 different combinations of band reject filters and time delays that can be used for the first branch if each filter-time delay pair is unique. If the same combination cannot be used for the second and third branch, we have 3599 combinations for the second branch and 3598 combinations for the third branch. Taken together we have the potential of generating about $4.6 \times 10^{10}$ different output signals given a single input signal having bandwidth covering the rejection frequencies of the five band reject filters. We have therefore the potential of getting $4.6 \times 10^{10}$ different tag addresses from a single input signal by utilizing different combinations of the five filters and the five time delays.

Figure 8:
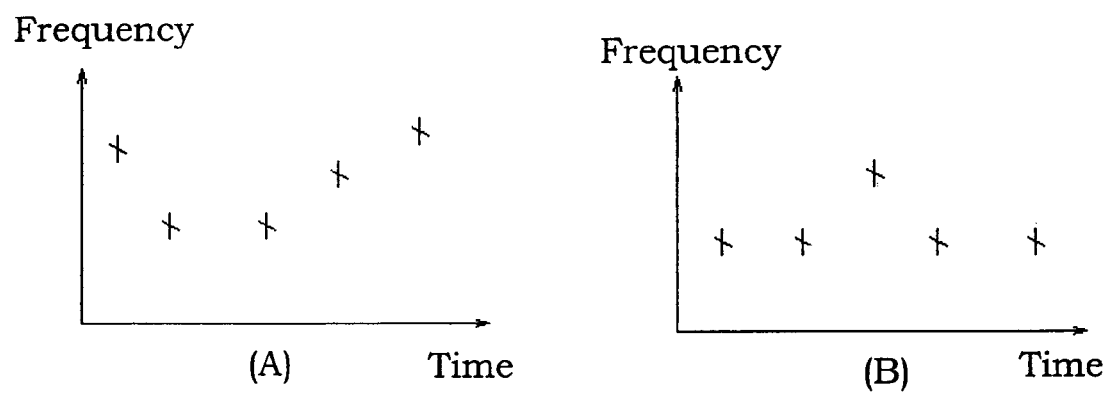
FIG. 8 illustrates how the responses of the data carrier devices will be decoded using their energy distribution in both the frequency and time domain.

The response of the data carrier device according to the present invention is a signal that will be decoded using their amplitude distribution in both frequency and time domain. FIGS. 8A and 8B illustrate two such response examples from two different data carrier devices from a frequency-time perspective. As can be seen from the figures, the frequencies at different times are different between these signals and this difference can be the basis for classifying or decoding different data. Therefore, different such frequency-time-amplitude relationships of the responses can be interpreted as different codes encoded in the data carrier device. As in quadrature phase shift modulation (QPSK) where four different phases of a signal result in a bit capacity of $\log_2 4=2$ bits, the capability of generating methodically N different signals with different frequency-time-amplitude relationships for the data carrier device result in a data carrying capacity of $\log_2 N$ bits.

It will be understood by a person skilled in the art that various modifications and changes may be made to the present invention without departure from the scope thereof, which is defined by the appended claims.

The invention claimed is:

1. A passive data carrier device comprising:
at least one input port adapted for receiving a finite duration radio frequency ("RF") input signal of defined time and frequency spectral characteristics;
M branches, each having an input terminal connected to an input port of said at least one input port and comprising passive RF elements for processing said input signal; and
at least one output port, each being connected to a branch of said M branches, wherein
each of said M branches comprises a combination of $R_k$ RF band filters and $S_k$ RF time delays, k=1 to M, where $R_k$, $S_k$ are positive integers and at least one of $R_k$ and $S_k$ is larger than one if M is equal to one and both $R_k$ and $S_k$ are equal to or larger than one if M is a positive integer larger than one,
the combination of said $R_k$ RF band filters and $S_k$ RF time delays being different for different branches of said M branches, and
a processed RF output signal at said at least one output port has time and frequency spectral characteristics different from said RF input signal.

2. The device according to claim 1, wherein each of said M branches comprises a combination of $N_k$ pairs of a RF band filter and a RF time delay, k=1 to M, where $N_k$ is a positive integer larger than one if M is equal to one and $N_k$ is a positive integer equal to or larger than one if M is a positive integer larger than one.

3. The device according to claim 2, wherein M is a positive integer larger than one.

4. The device according to claim 2, wherein $R_k$, $S_k$ are positive integers larger than one.

5. The device according to claim 1, wherein M is a positive integer larger than one.

6. The device according to claim 5, further comprising a RF power divider having an input terminal connected to said at least one input port and having M output terminals, where each output terminal is connected to the input terminal of a respective branch of said M branches.

7. The device according to claim 6, further comprising a RF power combiner having M input terminals, where each input terminal is connected to an output terminal of a respective branch of said M branches, and an output terminal connected to said at least one output port.

8. The device according to claim 6, further comprising a RF power combiner having M input terminals, where each input terminal is connected to an output terminal of a respective branch of said M branches, and an output terminal connected to a termination.

9. The device according to claim 6, further comprising M terminations, where each termination is connected to an output terminal of a respective branch of said M branches.

10. The device according to claim 5, further comprising a RF power combiner having M input terminals, where each input terminal is connected to an output terminal of a respective branch of said M branches, and an output terminal connected to said at least one output port.

11. The device according to claim 5, further comprising a RF power combiner having M input terminals, where each input terminal is connected to an output terminal of a respective branch of said M branches, and an output terminal connected to a termination.

12. The device according to claim 11, wherein said termination is selected from a group consisting of:
an energy dissipater;
an energy absorber;
an open circuit; and
a short circuit.

13. The device according to claim 5, further comprising M terminations, where each termination is connected to an output terminal of a respective branch of said M branches.

14. The device according to claim 13, wherein said termination is selected from a group consisting of:
- an energy dissipater;
- an energy absorber;
- an open circuit; and
- a short circuit.

15. The device according to claim 1, wherein $R_k$, $S_k$ are positive integers larger than one.

16. The device according to claim 1, wherein said RF band filters are selected from a group consisting of:
- a RF band pass filter; and
- a RF band reject filter.

17. The device according to claim 1, wherein said input port being a combined input and output port.

18. A radio frequency identification tag comprising:
- at least one passive data carrier device according to claim 1; and
- at least one antenna connected to said at least one passive data carrier device.

19. The identification tag according to claim 18, wherein each antenna of said at least one antenna is connected to a respective combined input and output port of said at least one passive data carrier device.

20. The identification tag according to claim 18, wherein said at least one antenna is an antenna system comprising:
- at least one receiving antenna, where each receiving antenna is connected to a respective input port of said at least one passive data carrier device; and
- at least one transmitting antenna, where each transmitting antenna is connected to a respective output port of said at least one passive data carrier device.

21. The device according to claim 1, wherein said M branches are free of any active RF elements.

* * * * *

UNITED STATES PATENT AND TRADEMARK OFFICE
CERTIFICATE OF CORRECTION

PATENT NO.        : 8,608,088 B2                                Page 1 of 1
APPLICATION NO.   : 12/746578
DATED             : December 17, 2013
INVENTOR(S)       : Dhanesh G. Kurup It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this
Twenty-second Day of September, 2015

Michelle K. Lee
*Director of the United States Patent and Trademark Office*